Patented July 25, 1933

1,919,676

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

METHOD OF MAKING INVERTASE PREPARATIONS

No Drawing.    Application filed September 30, 1931.    Serial No. 566,163.

This invention relates to certain improvements in invertase preparations, particularly yeast invertase, and to methods or processes for producing such preparations.

Products containing the enzyme invertase are used in certain industries for inverting cane sugar and have gone largely into use in the production of certain confections, as, for instance, the soft or cream centers of which certain kinds of candy are made. The use of yeast invertase has been suggested in the Booker United States Patent No. 1,309,979, and a standardized invertase preparation has been suggested in the Paine and Hamilton United States Patent No. 1,437,816.

The general method of making invertase preparations consists in making an autolyzed yeast liquor by permitting yeast to undergo self-digestion in the presence of a suitable antiseptic, for instance, toluol. During this digestion, certain constituents of the yeast cell contents are solubilized and the invertase contained in the yeast cells is liberated and gradually diffuses into the liquor. The insoluble cell parts are separated from the liquor by filtering or other suitable or desired method, and the liquor is then usually concentrated by evaporation at low temperature and preserved by the addition of sufficient toluol.

The methods of these patents and the general methods of making invertase preparations have, however, certain commercial and technical disadvantages, and it is the special object of the present invention to provide certain improved processes for producing an invertase preparation which overcomes the objections of the preparations now on the market, an invertase preparation which can easily be standardized, and which shows increased heat resistance as well as high stability and keeping quality.

A further object is the production of an invertase solution of standardized activity, and in which the customary use of objectionable preservatives, as, for instance, the addition of toluol, has been avoided.

With these and other objects not specifically referred to in view, the present invention consists in certain novel processes and methods which will be described and claimed in the appended claims.

I have found, however, that by my new processes I am able to produce invertase preparations which are an improvement on the commercial products in use at present and which have the property of being more heat resisting, very stable, and of excellent keeping quality, and which do not need the addition of objectionable preservatives, as toluol or any other antiseptics, to assure their preservation.

The following examples will describe certain of my preferred methods of preparing my improved product.

An autolyzed yeast liquor containing the invertase, may be used as such, but is preferably first concentrated by evaporating same at a low temeprature, that is, one preferably not exceeding 40° C. and is preferably filtered. I then proceed to treat this liquor with a sufficient amount of a suitable water soluble precipitating reagent, for instance, ethyl alcohol, to form a precipitate in the liquor which will contain a substantial part of the invertase contained in the autolyzed liquor. As a general rule, I have found that 2 volumes of 95% alcohol, for each volume of the liquor, gives satisfactory results.

This invertase containing precipitate can be separated from the liquor in various ways, for instance, by centrifuging or by filtration. In either case the addition of a small amount of an inert material, for instance, infusorial earth, has been found to greatly facilitate the separation as well as subsequent procedure. For the purpose of making my invertase preparation, this precipitate is then treated with glycerine solution, the glycerine solution having the property to dissolve from the precipitate the active invertase. A preferred method of such a treatment is by intimately mixing the precipitate with the glycerine solution, containing from 30 to 70% of glycerine, and preferably about 55 to 60%. I have found that the resulting glycerine invertase preparation prepared as above described is, after filtration, exceedingly stable and of surprisingly good keeping quality and heat resistance. If it is found to have an activity higher than desired, it can readily be standardized by diluting same with glycerine solution containing the desired percentage of glycerine. The resulting invertase product will, under proper storage and packing conditions, keep for long times without losing its activity and does not need the addition of toluol, or any other antiseptic, and has been found to be very suitable for commercial use, for instance, in the manufacture of so-called cream center candies.

Another example of producing such a standardized invertase preparation embodying the invention, consists in preparing first an autolyzed yeast liquor according to well known methods and then evaporating this autolyzed liquor in a vacuum apparatus at low temperatures, preferably not exceeding 40° C., so that no substantial inactivation of the invertase will occur. As a general rule, evaporation of the autolyzed liquor to approximately ¼ to ⅕ of its original volume will be satisfactory for the process. The evaporated autolyzed liquor is filtered and its inverting power determined by well known methods. To this evaporated or concentrated autolyzed liquor, glycerine is then added in such an amount and in such concentration that the finished product will have the desired activity and at the same time show a glycerine content of from 30 to 70%. The resulting product, which contains the glycerine and the concentrated autolyzed yeast liquor, is useful as a commercial invertase preparation, which shows a remarkably high stability, high heat resistance and is of excellent quality, and one that is well adapted for commercial use. The addition of toluol or any other objectionable chemical preservative will be found to be entirely unnecessary.

As a modification of this method of preparing invertase preparation, I may also add the proper amount of glycerine to the autolyzed liquor and then evaporate the resulting product which contains both autolyzed yeast liquor and glycerine. This evaporation should, of course, also take place at temperatures sufficiently low that no substantial inactivation of the invertase occurs, and that is at temperatures of about 40° C., and should be carried far enough so that the resulting finished preparation shows a glycerine content preferably of from 30 to 70%. It is then filtered and standardized to the desired activity, by the addition of further glycerine solution.

I have also found that in the presence of glycerine it is possible to use higher temperatures of evaporation, as the glycerine acts as a protector to the invertase.

Another example of producing such a standardized invertase preparation embodying the invention, consists in purifying the autolyzed invertase containing liquor, either by dialysis or by ultra-filtration. Any of the well known methods of dialysis or ultra-filtration may be used, provided that care is taken that the temperature at all times will be kept sufficiently low, that is to say, one not exceeding 40° C., to prevent any destruction or inactivation of the invertase. In either case the dialyzed or ultra-filtered invertase containing liquor may, if necessary, first be concentrated, preferably in a vacuum apparatus, at as low a temperature as possible, for instance, one not exceeding 40° C. The evaporated dialyzed or ultra-filtered liquor is filtered and its inverting power determined by well known methods. To this concentrated purified liquor, glycerine is then added in such an amount and in such concentration that the finished product will have the desired invertase activity and at the same time show a glycerine content of from 30 to 70%. The resulting product, which contains the glycerine and the dialyzed or ultra-filtered yeast, shows remarkably good stability, a high heat resistance and is of excellent quality, and one that is well adapted for commercial use. The addition of toluol or any other objectionable chemical preservatives will be found to be entirely unnecessary.

A further modification of preparing my glycerine containing invertase preparation consists in using kaolin or aluminum hydroxide for adsorbing the active invertase containing principle from the autolyzed yeast liquor, this being used in suitable amounts to effect proper adsorption. The invertase so adsorbed can then again be recovered from the adsorbents by a process known as "elution". I have found that by adding to such invertase solutions produced by this elution, sufficient glycerine so that the final product contains from 30 to 70% glycerine, a very stable and commercially excellent invertase preparations can be prepared.

The glycerine invertase composition prepared according to the above processes and of the above compositions is a clear pale yellow liquor, tending to become turbid and to darken slightly upon standing, which is either odorless or has a slightly yeasty odor and which has a specific gravity of room temperature of between 1.08 and 1.18. As prepared the composition is standardized so that 0.05 to 0.8 grams of it (that is an average of 0.2 grams) will at a pH of 4.5 and at a temperature of 20° C. invert 7.57 grams of sucrose in 10% aqueous solution in 135 minutes.

What is claimed is:
1. Process of preparing an invertase preparation from yeast, which comprises preparing a yeast liquor containing active invertase, concentrating this liquor at temperatures below 40° C., filtering the concentrate, and adding glycerine to bring the concentrate to a glycerine content of from 30 to 70%, so as to produce an invertase prepara- tion containing glycerine of standardized activity.

2. Process of preparing an invertase preparation from yeast, which comprises preparing yeast liquor containing active invertase, concentrating this liquor at temperatures below 40° C., precipitating from this liquor an enzymatic substance by the addition of alcohol, separating the precipitate from the liquor, and adding to the precipitate glycerine in proportions to produce a preparation having a content of from 30 to 70%, so as to produce an invertase preparation containing glycerine of standardized activity.

3. Process of preparing an invertase preparation from yeast, which comprises preparing a yeast liquor containing active invertase, concentrating this liquor at temperatures below 40° C., precipitating from this liquor an enzymatic substance by the addition of alcohol, separating the precipitate from the liquor, and intimately mixing the precipitate with an aqueous glycerine solution containing from 30 to 70% glycerine.

4. Process of preparing an invertase preparation from yeast, which comprises preparing a yeast liquor containing invertase, purifying this liquor by dializing same, evaporating the dialyzed liquor at temperatures where no substantial destruction of invertase takes place to concentrate it, filtering this liquor, adding glycerine to this concentrate so as to produce a dialyzed invertase solution containing 30 to 70% glycerine.

5. Process of preparing an invertase preparation from yeast, which comprises preparing a yeast liquor containing invertase, purifying this yeast liquor by means of ultra-filtration, adding glycerine to this ultra-filtered product so as to produce an invertase solution containing 30 to 70% of glycerine.

6. Process of preparing an invertase preparation from yeast, which comprises preparing a yeast liquor containing invertase, treating this yeast liquor with an invertase adsorbent, removing the adsorbent from the liquor and eluting from the adsorbent the active invertase containing principle with an elution liquor containing from 30 to 70% of glycerine.

LEO WALLERSTEIN.